US012605847B2

(12) United States Patent
Finkelson

(10) Patent No.: US 12,605,847 B2
(45) Date of Patent: Apr. 21, 2026

(54) ROBOTIC ARM FOR DISPENSING A BEVERAGE

(71) Applicant: Gregory Finkelson, San Francisco, CA (US)

(72) Inventor: Gregory Finkelson, San Francisco, CA (US)

( * ) Notice: Subject to any disclaimer, the term of this patent is extended or adjusted under 35 U.S.C. 154(b) by 153 days.

(21) Appl. No.: 18/107,047

(22) Filed: Feb. 8, 2023

(65) Prior Publication Data

US 2024/0261978 A1     Aug. 8, 2024

(51) Int. Cl.
B25J 11/00          (2006.01)

(52) U.S. Cl.
CPC .................................... B25J 11/008 (2013.01)

(58) Field of Classification Search
CPC ........ B25J 11/008; B25J 18/00; B25J 18/007; B25J 13/086; B25J 13/089
See application file for complete search history.

(56) References Cited

U.S. PATENT DOCUMENTS

| | | |
|---|---|---|
| 7,577,498 B2 | 8/2009 | Jennings et al. |
| 10,793,412 B2 | 10/2020 | Ratti |
| 2006/0037969 A1* | 2/2006 | Jennings .............. B67D 1/0041 |
| | | 222/129.1 |
| 2006/0043111 A1 | 3/2006 | Jennings et al. |
| 2009/0198380 A1* | 8/2009 | Friedman ............. G05D 1/0219 |
| | | 901/1 |

| | | |
|---|---|---|
| 2017/0334062 A1 | 11/2017 | Allen et al. |
| 2017/0348854 A1 | 12/2017 | Oleynik |
| 2021/0402610 A1* | 12/2021 | Lee ........................ B25J 11/008 |

FOREIGN PATENT DOCUMENTS

| | | | | |
|---|---|---|---|---|
| DE | 202015002531 U1 * | 8/2016 | ............ | B25J 11/008 |

OTHER PUBLICATIONS https://www.kuka.com/en-us/future-production/innovation-and-research/current-topics-from-the-world-of-research/events/erf/erf-2017 https://www.youtube.com/watch?v=oaaaupcZ_GE (Year: 2017).*
Adaptive Pouring of Liquids Based on Human Motions Using a Robotic Arm, by Jeremias Kornelius Hartz, 2018 (attached) (Year: 2018).*
Robotic Bartender https://www.youtube.com/watch?v=ug6OPsrbd8w (Year: 2018).*

(Continued)

*Primary Examiner* — Abby Lin
*Assistant Examiner* — Renee LaRose
(74) *Attorney, Agent, or Firm* — Patent Law Clinic, New York Law School

(57)          ABSTRACT

A system and method for dispensing a beverage by using a robotic arm are disclosed. The method includes detecting one or more individuals in front of a bar countertop by using a set of sensors. Further, the method includes individually fetching one or more glasses from a glass resting tray based on the detected one or more individuals. Furthermore, the method includes placing each of the fetched one or more glasses individually, on the bar countertop. The method further includes fetching a beverage bottle from a bottle resting tray upon placing the one or more glasses on the bar counter top. The method includes pouring a predefined volume of the beverage from the fetched beverage bottle in each of the one or more glasses placed on the bar countertop.

23 Claims, 7 Drawing Sheets

(56) References Cited

OTHER PUBLICATIONS https://scarlettentertainment.com/us/blog/rise-of-the-robots-technology-for-your-trade-show (2019) (Year: 2019).*

DE-202015002531-U1—Kuka english translation (Year: 2020).*

Personalized Human-Robot Interaction with a Robot Bartender (2022), John, Rossi and Rossi (hereinafter referred to as Brillo) (Year: 2022).* https://www.google.com/search?q=brillo+the+bartending+robot&rlz=1C1GCEA_enUS1049US1049&oq=brillo+the+bartending+robot&gs_lcrp=EgZjaHJvbWUyBggAEEUYOTIGCAEQRRg8MgYIAhBFGDzSAQg4ODE0ajBqNKgCALACAQ&sourceid=chrome&ie=UTF-8#fpstate=ive&vld=cid:181cbdfe,vid:05e118H6Cco,st:0 (Year: 2022).* https://www.kuka.com/en-us/future-production/innovation-and-research/current-topics-from-the-world-of-research/events/erf/erf-2017 (Year: 2017) (Kuka).* https://www.youtube.com/watch?v=ug6OPsrbd8w (Year: 2018).* https://www.royalcaribbeanpresscenter.com/video/643/anthem-of-the-seas-instaship-bionic-bar// (Year: 2015).* https://scarlettentertainment.com/us/blog/rise-of-the-robots-technology-for-your-trade-show (Year: 2019).*

* cited by examiner

Computing
System 100

200

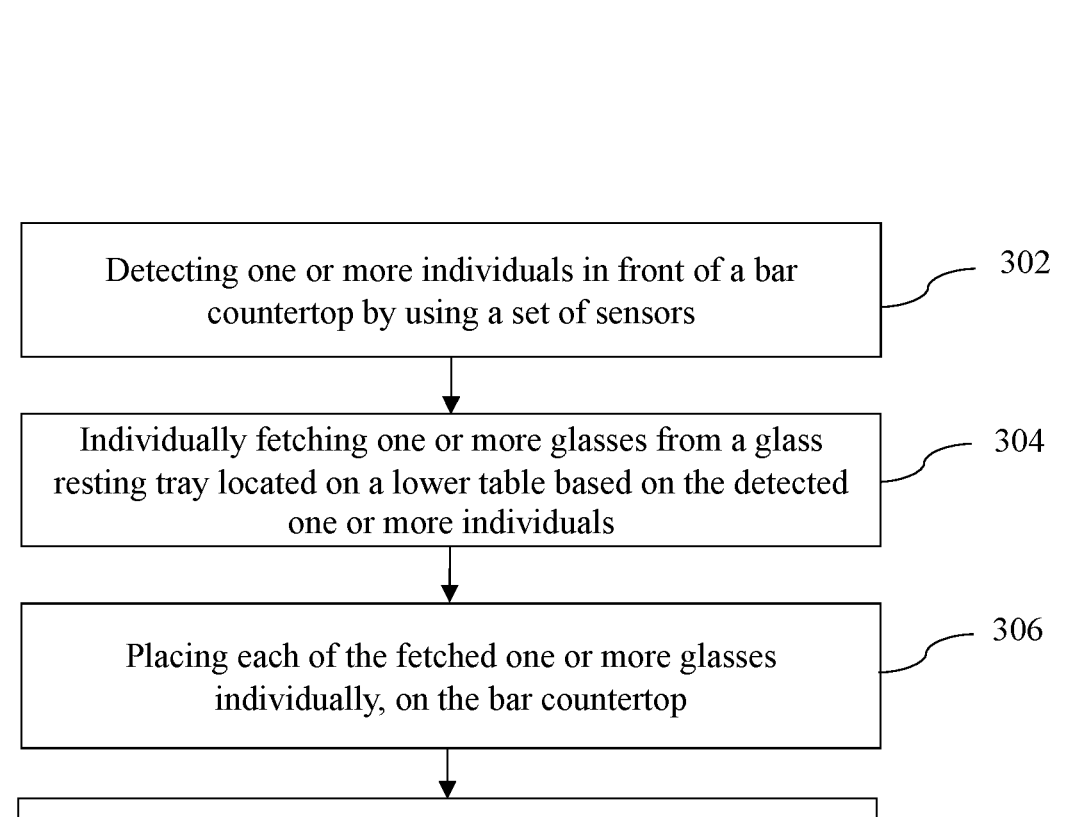

300

Detecting one or more individuals in front of a bar countertop by using a set of sensors — 302

Individually fetching one or more glasses from a glass resting tray located on a lower table based on the detected one or more individuals — 304

Placing each of the fetched one or more glasses individually, on the bar countertop — 306

Fetching a beverage bottle from a bottle resting tray upon placing the one or more glasses on the bar counter top — 308

Pouring a predefined volume of the beverage from the fetched beverage bottle in each of the one or more glasses placed on the bar countertop — 310

FIG. 3

ROBOTIC ARM FOR DISPENSING A BEVERAGE

FIELD OF INVENTION

Embodiments of a present disclosure relate to robots and more particularly to a robotic arm for dispensing a beverage.

BACKGROUND

Generally, bartenders serve a variety of beverages including wine, mocktails, cocktails, and the like to multiple guests of commercial establishments, such as bar, restaurants, café and the like. However, there are multiple issues associated with such bartenders, such as high cost, fatigue, increased time of serving, and the like. Also, such bartenders are required to be train for serving the beverage which consumes a lot of time and efforts of the commercial establishments. Further, the bartenders also require breaks and leaves during the period of their employment which may result in loss of business of the commercial establishments. Usually, organizations and firms organize their private meetings in such commercial establishments to discuss specific agendas. The presence of bartenders in such private meetings may affect attendee's privacy, confidentiality, and comfort.

Hence, there is a need for a robotic arm for dispensing a beverage in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a robot including at least one robotic arm for dispensing a beverage is disclosed. The robotic arm is having at least three degrees of motion. The robotic arm includes one or more hardware processors and a memory coupled to the one or more hardware processors. The memory includes a plurality of modules in the form of programmable instructions executable by the one or more hardware processors. The plurality of modules include a detection module configured to detect one or more individuals in front of a bar countertop by using a set of sensors. The plurality of modules also include a glass fetching module configured to individually fetch one or more glasses from a glass resting tray located on a lower table based on the detected one or more individuals. Further, the glass fetching module places each of the fetched one or more glasses individually, on the bar countertop. Further, the plurality of modules include a bottle fetching module configured to fetch a beverage bottle from a bottle resting tray upon placing the one or more glasses on the bar counter top. The bottle fetching module pours a predefined volume of the beverage from the fetched beverage bottle in each of the one or more glasses placed on the bar countertop.

In accordance with another embodiment of the present disclosure, a method for dispensing a beverage by using a robotic arm is disclosed. The method includes detecting one or more individuals in front of a bar countertop by using a set of sensors. Further, the method includes individually fetching one or more glasses from a glass resting tray located on a lower table based on the detected one or more individuals. Furthermore, the method includes placing each of the fetched one or more glasses individually, on the bar countertop. The method further includes fetching a beverage bottle from a bottle resting tray upon placing the one or more glasses on the bar counter top. The method includes pouring a predefined volume of the beverage from the fetched beverage bottle in each of the one or more glasses placed on the bar countertop.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 is a process flow diagram illustrating an exemplary method for dispensing a beverage by using a robotic arm, in accordance with an embodiment of the present disclosure.

Figure 1:
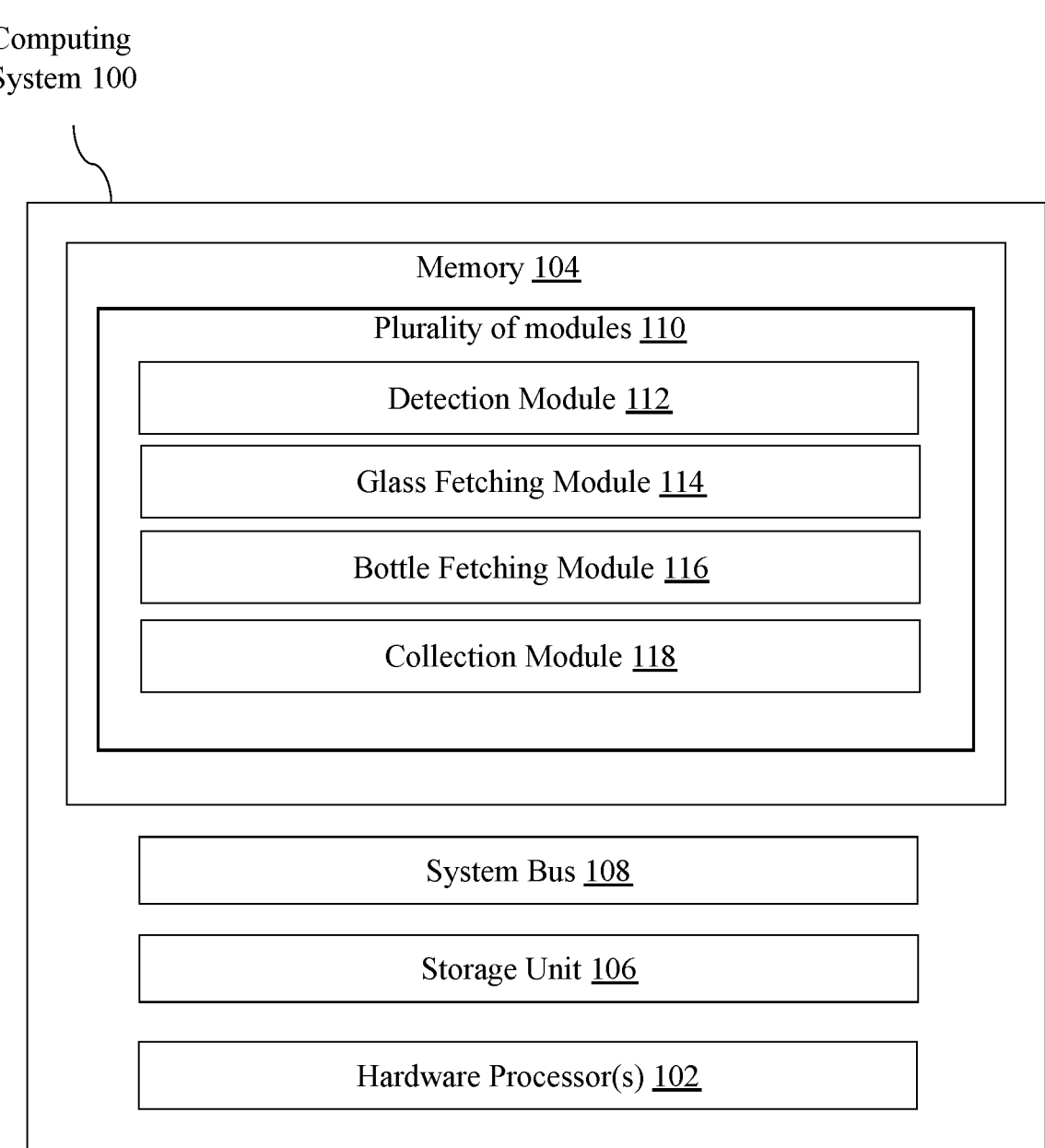
FIG. 1 is a block diagram illustrating an exemplary computing system associated with the robotic arm for dispensing a beverage, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 is a block diagram illustrating an exemplary computing system 100 associated with the robotic arm for dispensing a beverage, in accordance with an embodiment of the present disclosure. In an exemplary embodiment of the present disclosure, the robotic arm is a wine tasting apparatus. The computing system 100 comprises one or more hardware processors 102, a memory 104 and a storage unit 106. The one or more hardware processors 102, the memory 104 and the storage unit 106 are communicatively coupled through a system bus 108 or any similar mechanism. The memory 104 comprises the plurality of modules 110 in the form of programmable instructions executable by the one or more hardware processors 102. Further, the plurality of modules 110 includes a detection module 112, a glass fetching module 114, a bottle fetching module 116, and a collection module 118.

The one or more hardware processors 102, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 102 may also include embedded controllers, such as generic or programmable logic devices or arrays, application specific integrated circuits, single-chip computers, and the like.

The memory 104 may be non-transitory volatile memory and non-volatile memory. The memory 104 may be coupled for communication with the one or more hardware processors 102, such as being a computer-readable storage medium. The one or more hardware processors 102 may execute machine-readable instructions and/or source code stored in the memory 104. A variety of machine-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes the plurality of modules 110 stored in the form of machine-readable instructions on any of the above-mentioned storage media and may be in communication with and executed by the one or more hardware processors 102.

The storage unit 106 may be a cloud storage or a local file directory within a remote server. The storage unit 106 may store a set of instructions to facilitate at least three degrees of motion of the robotic arm for dispensing the beverage.

The detection module 112 is configured to detect one or more individuals sitting at or standing in front of a bar countertop by using a set of sensors. In an exemplary embodiment of the present disclosure, the set of sensors comprise proximity sensors, ultrasonic sensors, capacitive sensors, photoelectric sensors, inductive sensors, magnetic sensors, image sensors, and the like.

The glass fetching module 114 is configured to individually fetch one or more glasses from a glass resting tray located on a lower table based on the detected one or more individuals sitting or standing at the bar counter top. For example, when the number of one or more individuals standing in front of the bar counter top is 4, the robotic arm fetches three glasses one by one for the three detected individuals. In an embodiment of the present disclosure, the glass resting tray is used for holding a plurality of containers. For example, the plurality of containers includes a plurality of glasses. In an embodiment of the present disclosure, the robotic arm associated with the robot has a three degree of motions for performing a set of tasks, such as picking up the glasses, picking up the bottle, placing the glasses on the bar countertop and the like. The robotic arm includes a set of joint mechanism to facilitate the robotic arm to have at least three degrees of motion. Details on the set of joint mechanism has been explained in further paragraphs by using FIGS. 2A-2D.

Further, the glass fetching module 114 places each of the fetched one or more glasses individually, on the bar countertop. The one or more glasses are placed in vicinity of the detected one or more individuals. For example, the one or more glasses corresponds to four wine glasses.

In some instances, the glass fetching module 114 is configured to determine a number of glasses to be fetched based on a certain event such as the number of tickets purchased for wine testing event, for example. According to some embodiments, the glass fetching module can be configured to fetch a predetermined number of glasses, such as 4 glasses, for example.

The bottle fetching module 116 is configured to fetch a beverage bottle from a bottle resting tray upon placing the one or more glasses on the bar counter top. For example, the beverage bottle is a wine bottle. In an embodiment of the present disclosure, the bottle resting tray is configured to hold a plurality of bottles, such as wine bottles. Further, the bottle fetching module 116 pours a predefined volume of the beverage from the fetched beverage bottle in each of the one or more glasses placed on the bar countertop. In an exemplary embodiment of the present disclosure, the predefined volume of the beverage is 2 oz of wine.

Further, the bottle fetching module 116 is configured to place the beverage bottle on the bottle resting tray after pouring the predefined volume of the beverage in each of the one or more glasses.

In an embodiment of the present disclosure, the detection module 112 is configured to detect if the one or more individuals require more beverage in the one or more glasses based on one or more gestures of the one or more individuals. In an embodiment of the present disclosure, the one or more gestures of the one or more individuals are captured by using one or more cameras and the set of sensors. For example, the one or more gestures include a wave action, raising hand, and one or more hand symbols. In an exemplary embodiment of the present disclosure, the one or more hand symbols may be peace symbol, and the like.

Further, the bottle fetching module 116 is configured to fetch the beverage bottle from the bottle resting tray upon detecting that the one or more individuals require more beverage in the one or more glasses. The bottle fetching module 116 is configured to pour the predefined volume of the beverage from the fetched beverage bottle in each of the one or more glasses placed on the bar countertop. Furthermore, the bottle fetching module 116 places the beverage bottle on the bottle resting tray after pouring the predefined volume of the beverage in each of the one or more glasses.

In an embodiment of the present disclosure, the bottle fetching module 116 individually fetches the one or more glasses placed on the bar countertop. The bottle fetching module 116 drains leftover beverage in each of the fetched one or more glasses in the spittoon. Further, the bottle fetching module 116 places each of the fetched one or more glasses on a used glasses tray individually, after draining the leftover beverage.

Similarly, the robotic arm may perform same movements with other beverage bottles. For the purpose of explanation, a single beverage bottle is used for wine tasting. However, a person skilled in the art may easily construe the same invention to be applied for multiple beverage bottles.

The collection module 118 is configured to fetch a tip glass from the glass resting tray upon placing each of the fetched one or more glasses on the used glasses tray. In an embodiment of the present disclosure, the tip glass has a tip sticker on its surface. The collection module 118 moves the fetched tip glass to the one or more individuals to collect tips.

In an embodiment of the present disclosure, the robotic arm is configured to perform one or more movements. For example, the one or more movements include dance left, dance right, bow, shake, and the like.

Embodiments of the application further provide a non-transitory computer-readable storage medium, in which a computer program is stored. When executed by the processor, the computer program may dispense the beverage for a variety of purposes, such as wine tasting.

The non-transitory computer-readable storage medium may be any combination of one or more computer-readable media. The computer-readable medium may be a computer-readable signal medium or a computer-readable storage medium. The computer-readable storage medium may be, but is not limited to, for example, an electrical, magnetic, optical, electromagnetic, infrared or semiconductor system, device or apparatus or any combination thereof. More specific examples (non-exhaustive list) of the computer-readable storage medium include an electrical connector with one or more wires, a portable computer disk, a hard disk, a RAM, a ROM, an Erasable Programmable ROM (EPROM) or a flash memory, an optical fiber, a portable CD-ROM, an optical storage device, a magnetic storage device, or any proper combination thereof. In the application, the computer-readable storage medium may be any tangible medium including or storing a program that may be used by or in combination with an instruction execution system, device, or apparatus.

Figure 2A:
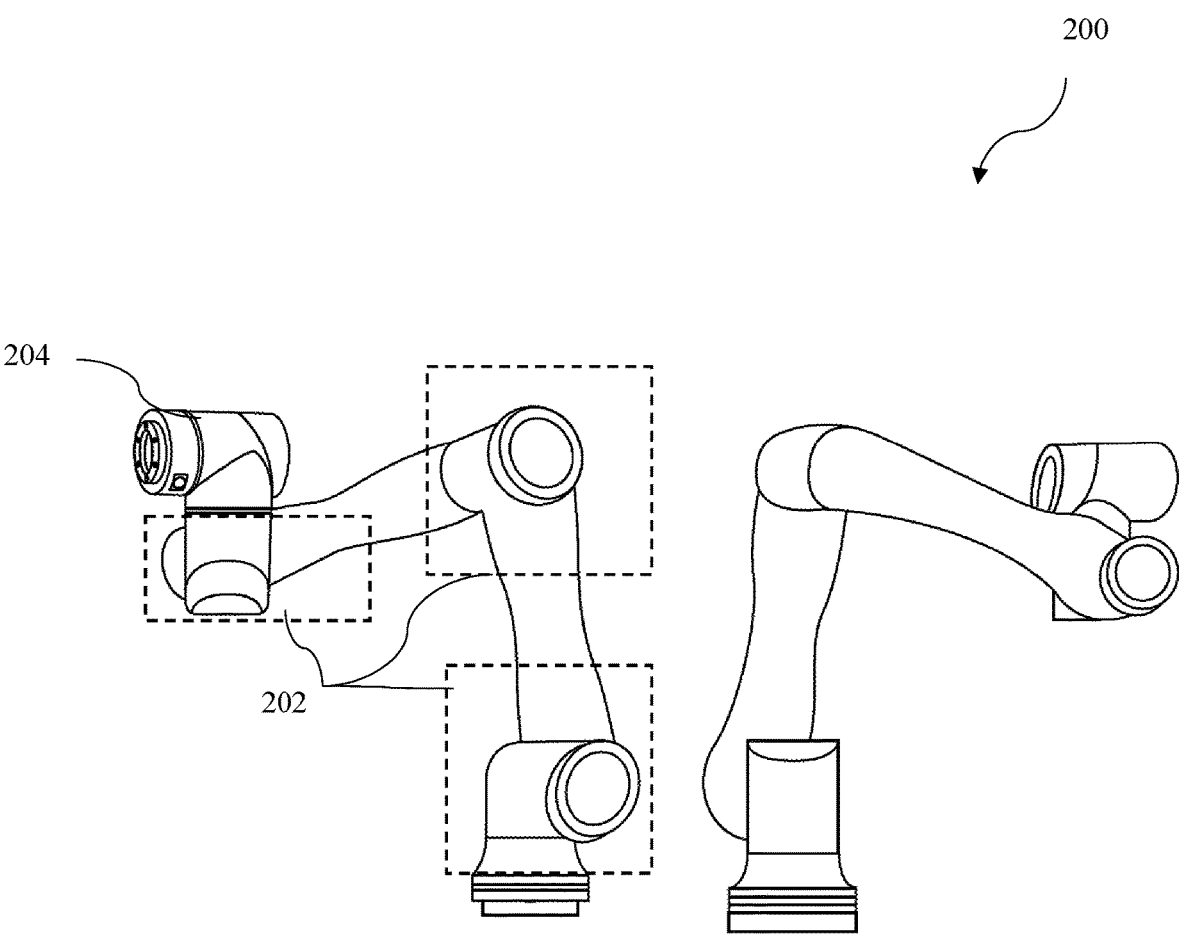
FIG. 2A is a perspective view of the robotic arm, in accordance with an embodiment of the present disclosure.
Figure 2B:
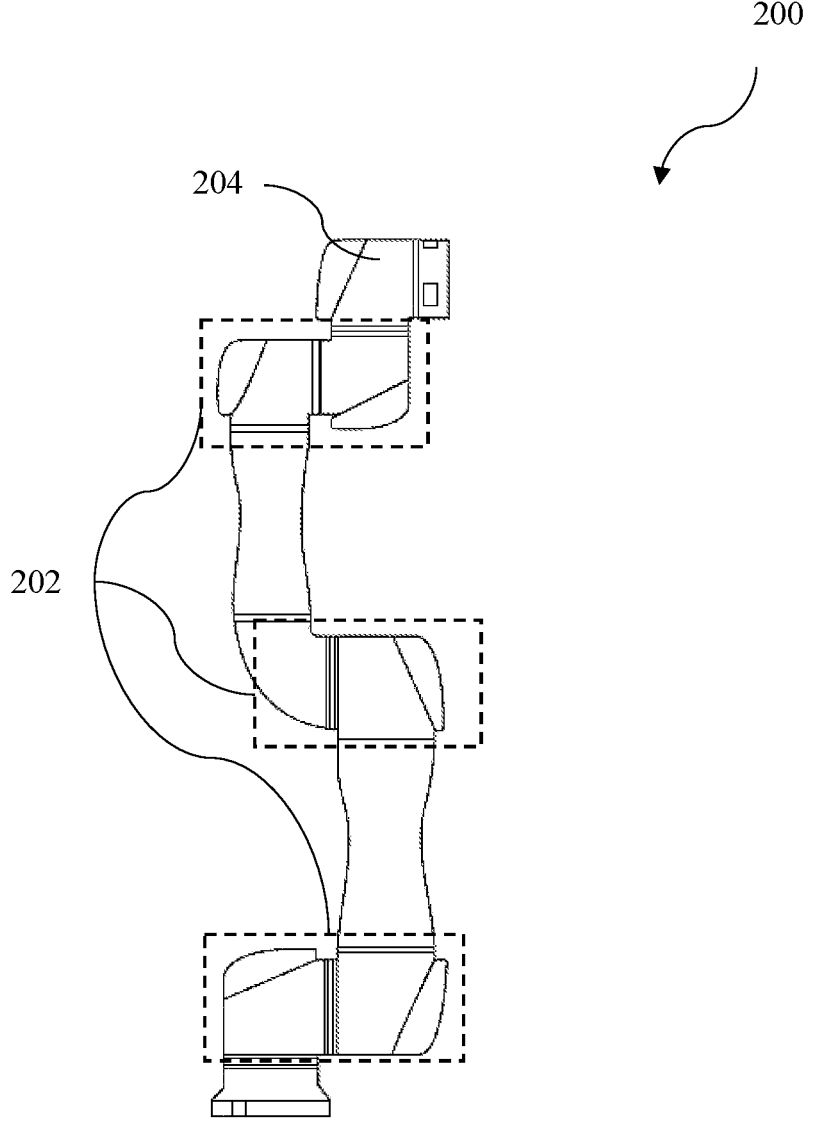
FIG. 2B is a front view of the robotic arm, in accordance with an embodiment of the present disclosure.
Figure 2C:
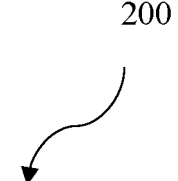
FIG. 2C is the top view of a robotic arm, in accordance with an embodiment of the present disclosure.
Figure 2C:
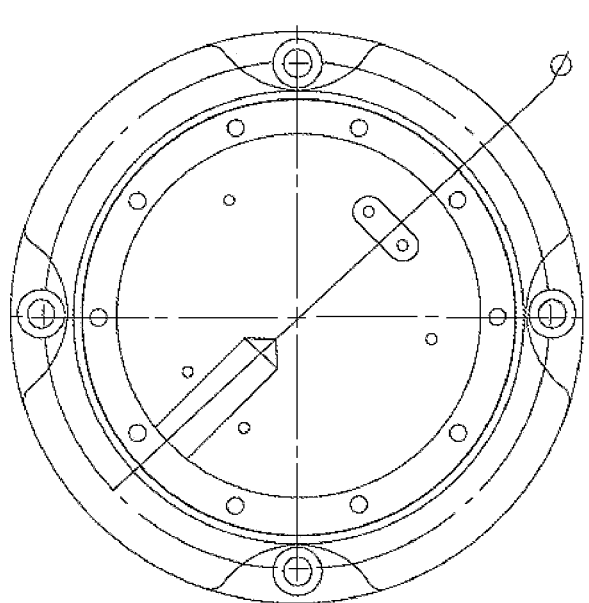
Figure 2D:
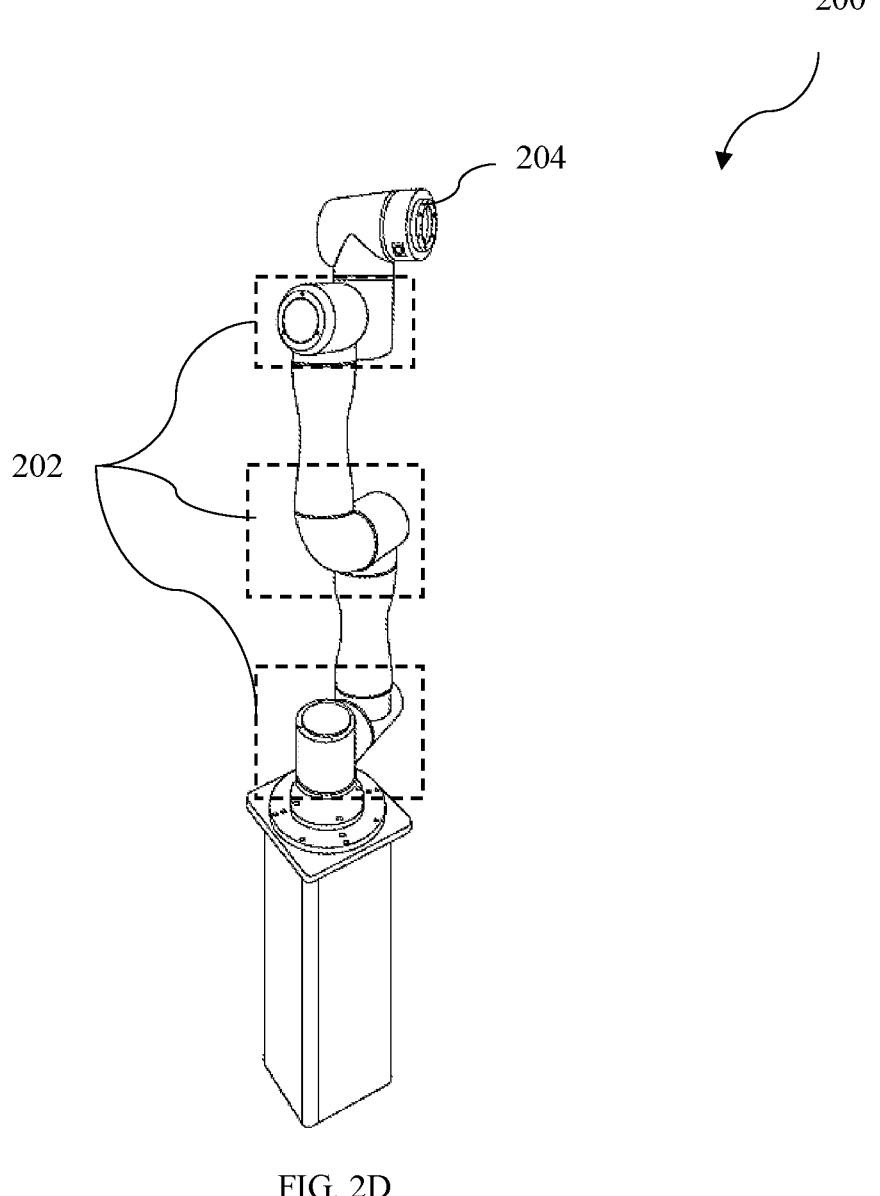
FIG. 2D is the perspective view of the robotic arm, in accordance with another embodiment of the present disclosure.
Figure 2E:
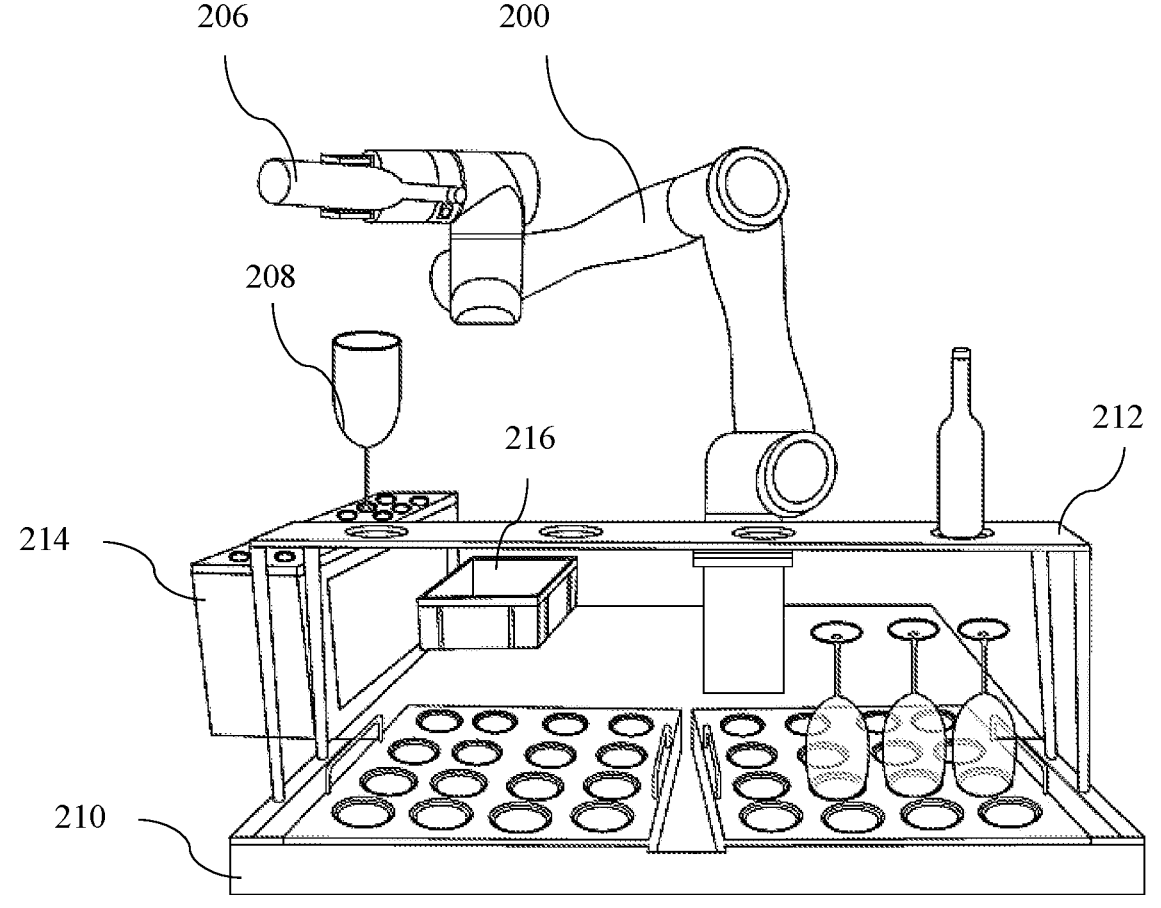
FIG. 2E is the perspective view of the robotic arm, in accordance with yet another embodiment of the present disclosure.

FIG. 2A is a perspective view of the robotic arm, in accordance with an embodiment of the present disclosure. Further, FIG. 2B is a front view of the robotic arm, in accordance with an embodiment of the present disclosure. FIG. 2C is the top view of a robotic arm, in accordance with an embodiment of the present disclosure. Furthermore, FIG. 2D is the perspective view of the robotic arm, in accordance with another embodiment of the present disclosure. FIG. 2E is the perspective view of the robotic arm, in accordance with yet another embodiment of the present disclosure. For the sake of brevity, FIGS. 2A-2E are explained together.

202 represents the set of joint mechanism to facilitate the robotic arm 200 to have at least three degrees of motion. The robotic arm 200 may be used for a variety of purposes, such as screwing on curved surface, stacking, carrying, painting, polishing, welding, massage, coffee wending, catering, agricultural picking, and the like. Further, a front portion 204 of the robotic arm 200 may be integrated with an arm holder to hold the glasses and the bottle. In an embodiment of the present disclosure, the robotic arm 200 is flexible, intelligent, safe and cost-effective. Further, the collision detection is upgraded and man robot integration is safer. Furthermore, drag display, visual programming, remote training support, unnecessarily master the programming language can be easily operated. In an embodiment of the present disclosure, speed and repeated positioning accuracy of the robot is optimized. The robotic arm 200 is configured to pick-up a weight of up to 16 kg.

As depicted in FIG. 2E, 206 represents a bottle, 208 represents one or more glasses, 210 represents the glass resting tray, 212 represents the bottle resting tray, 214 represents the bar counter top, and 216 represents the spittoon, which can be of various shapes, including spherical, or cubic, or cylindrical or any other shape suitable for collecting leftovers of wine or other beverages.

FIG. 3 is a process flow diagram illustrating an exemplary method for dispensing a beverage by using a robotic arm, in accordance with an embodiment of the present disclosure. At step 302, the method includes detecting one or more individuals in front of a bar countertop by using a set of sensors. In an exemplary embodiment of the present disclosure, the set of sensors comprise proximity sensors, ultrasonic sensors, capacitive sensors, photoelectric sensors, inductive sensors, magnetic sensors, image sensors, and the like.

At step 304, the method 300 includes individually fetching one or more glasses from a glass resting tray located on a lower table based on the detected one or more individuals. For example, when the number of one or more individuals standing in front of the bar counter top is 4, the robotic arm fetches three glasses one by one for the three detected individuals. In an embodiment of the present disclosure, the glass resting tray is used for holding a plurality of containers. For example, the plurality of containers include a plurality of glasses. In an embodiment of the present disclosure, the robotic arm associated with the robot has a three degree of motions for performing a set of tasks, such as picking up the glasses, picking up the bottle, placing the glasses on the bar countertop and the like. The robotic arm includes a set of joint mechanism to facilitate the robotic arm to have at least three degrees of motion.

At step 306, the method 300 includes placing each of the fetched one or more glasses individually, on the bar countertop. The one or more glasses are placed in vicinity of the detected one or more individuals. For example, the one or more glasses corresponds to four wine glasses.

At step 308, the method 300 includes fetching a beverage bottle from a bottle resting tray upon placing the one or more glasses on the bar counter top. For example, the beverage bottle is a wine bottle. In an embodiment of the present disclosure, the bottle resting tray is configured to hold a plurality of bottles, such as wine bottles.

Further, at step 310, the method 300 includes pouring a predefined volume of the beverage from the fetched beverage bottle in each of the one or more glasses placed on the bar countertop. In an exemplary embodiment of the present disclosure, the predefined volume of the beverage is 2 oz of wine.

Furthermore, the method 300 includes placing the beverage bottle on the bottle resting tray after pouring the predefined volume of the beverage in each of the one or more glasses. In an embodiment of the present disclosure, the method 300 includes detecting if the one or more individuals require more beverage in the one or more glasses based on one or more gestures of the one or more individuals. In an embodiment of the present disclosure, the one or more gestures of the one or more individuals are captured by using one or more cameras and the set of sensors. For example, the one or more gestures include a wave action, raising hand, and one or more hand symbols. In an exemplary embodiment of the present disclosure, the one or more hand symbols may be peace symbol, and the like.

Further, the method 300 includes fetching the beverage bottle from the bottle resting tray upon detecting that the one or more individuals require more beverage in the one or more glasses. The method 300 also includes pouring the predefined volume of the beverage from the fetched beverage bottle in each of the one or more glasses placed on the bar countertop. Furthermore, the method 300 includes placing the beverage bottle on the bottle resting tray after pouring the predefined volume of the beverage in each of the one or more glasses.

In an embodiment of the present disclosure, the method 300 includes individually fetching the one or more glasses placed on the bar countertop. The method 300 includes draining leftover beverage in each of the fetched one or more glasses in the spittoon. Further, the method 300 includes placing each of the fetched one or more glasses on a used glasses tray individually, after draining the leftover beverage.

Further, the method 300 includes fetching a tip glass from the glass resting tray upon placing each of the fetched one or more glasses on the used glasses tray. In an embodiment of the present disclosure, the tip glass has a tip sticker on its surface. The method 300 includes moving the fetched tip glass to the one or more individuals to collect tips.

In an embodiment of the present disclosure, the robotic arm is configured to perform one or more movements. For example, the one or more movements include dance left, dance right, bow, shake, and the like.

The method 300 may be implemented in any suitable hardware, software, firmware, or combination thereof.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:
1. A robot including at least one robotic arm for dispensing a beverage, the robotic arm having at least three degrees of motion comprising:
(a) one or more hardware processors; and
(b) a memory coupled to the one or more hardware processors, wherein the memory comprises a plurality of modules in the form of programmable instructions executable by the one or more hardware processors, and wherein the plurality of modules comprises:

(i) a detection module configured to detect one or more individuals in front of a bar countertop by using a set of sensors comprising proximity sensors, ultrasonic sensors, capacitive sensors, photoelectric sensors, inductive sensors, magnetic sensors, and image sensors, and to generate signals for beverage service operations based on the detected individuals;
(ii) a glass fetching module configured to:
individually fetch one or more glasses wherein the number of glasses fetched corresponds to the number of detected individuals, from a glass resting tray in response to the detected one or more individuals; and
place each of the fetched one or more glasses individually, on the bar countertop in the vicinity of the one or more detected individuals;
(iii) a bottle fetching module configured to:
fetch a beverage bottle from a bottle resting tray upon placing the one or more glasses on the bar countertop; and
pour a predefined volume of the beverage from the fetched beverage bottle in each of the one or more glasses placed on the bar countertop.
2. The robot of claim 1, wherein the bottle fetching module is configured to place the beverage bottle on the bottle resting tray after pouring the predefined volume of the beverage in each of the one or more glasses.
3. The robot of claim 1, wherein the robotic arm is a wine tasting apparatus, and wherein the beverage bottle corresponds to a wine bottle.
4. The robot of claim 1, wherein the one or more glasses corresponds to four wine glasses.
5. The robot of claim 1, wherein the predefined volume of the beverage is 2 oz of wine.
6. The robot of claim 1, wherein the detection module is further configured to:
detect if the one or more individuals require more beverage in the one or more glasses based on one or more gestures of the one or more individuals, wherein the one or more gestures of the one or more individuals are captured by using one or more cameras and the set of sensors, and wherein the one or more gestures comprise a wave action, raising hand, and one or more hand symbols.
7. The robot of claim 6, wherein the bottle fetching module is further configured to:
fetch the beverage bottle from the bottle resting tray upon detecting that the one or more individuals require more beverage in one or more glasses;
pour the predefined volume of the beverage from the fetched beverage bottle in each of the one or more glasses placed on the bar countertop; and
place the beverage bottle on the bottle resting tray after pouring the predefined volume of the beverage in each of the one or more glasses.
8. The robot of claim 6, wherein the bottle fetching module is further configured to:
individually fetch the one or more glasses placed on the bar countertop;
drain leftover beverage in each of the fetched one or more glasses in the spittoon; and
place each of the fetched one or more glasses on a used glasses tray individually, after draining the leftover beverage.

9. The robot of claim 1, wherein the robotic arm is configured to perform one or more movements, and wherein the one or more movements comprise dance left, dance right, bow, and shake.

10. The robot of claim 8, further comprising a collection module configured to:

fetch a tip glass from the glass resting tray upon placing each of the fetched one or more glasses on the used glasses tray, wherein the tip glass has a tip sticker on its surface; and move the fetched tip glass to the one or more individuals to collect tips.

11. The robot of claim 1, further comprises the glass resting tray for a holding a plurality of containers, and wherein the plurality of containers comprise a plurality of glasses.

12. The robot of claim 1, further comprises the bottle resting tray for holding a plurality of bottles.

13. The robot of claim 1, wherein the robotic arm comprises a set of joint mechanism to facilitate the robotic arm to have at least three degrees of motion.

14. A method for dispensing a beverage by using a robotic arm, the method comprising:

detecting, by one or more hardware processors, one or more individuals in front of a bar countertop by using a set of sensors to generate signals for beverage service operations based on the detected individuals;

individually fetching, by the one or more hardware processors, one or more glasses from a glass resting tray in response to the detected one or more individuals, wherein the number of glasses fetched corresponds to the number of detected individuals;

placing, by the one or more hardware processors, each of the fetched one or more glasses individually, on the bar countertop;

fetching, by the one or more hardware processors, a beverage bottle from a bottle resting tray upon placing the one or more glasses on the bar countertop; and pouring, by the one or more hardware processors, a predefined volume of the beverage from the fetched beverage bottle in each of the one or more glasses placed on the bar countertop in the vicinity of the one or more detected individuals.

15. The method of claim 14, further comprising placing the beverage bottle on the bottle resting tray after pouring the predefined volume of the beverage in each of the one or more glasses.

16. The method of claim 14, wherein the robotic arm is a wine tasting apparatus, and wherein the beverage bottle corresponds to a wine bottle.

17. The method of claim 14, wherein the one or more glasses corresponds to four wine glasses.

18. The method of claim 14, wherein the predefined volume of the beverage is 2 oz of wine.

19. The method of claim 14, further comprising detecting if the one or more individuals require more beverage in the one or more glasses based on one or more gestures of the one or more individuals, wherein the one or more gestures of the one or more individuals are captured by using one or more cameras and the set of sensors, and wherein the one or more gestures comprise a wave action, raising hand, and making hand symbols.

20. The method of claim 19, further comprising:

fetching the beverage bottle from the bottle resting tray upon detecting that the one or more individuals require more beverage in the one or more glasses;

pouring the predefined volume of the beverage from the fetched beverage bottle in each of the one or more glasses placed on the bar countertop; and placing the beverage bottle on the bottle resting tray after pouring the predefined volume of the beverage in each of the one or more glasses.

21. The method of claim 19, further comprising:

individually fetching the one or more glasses placed on the bar countertop;

draining leftover beverage in each of the fetched one or more glasses in the spittoon; and placing each of the fetched one or more glasses on a used glasses tray individually, after draining the leftover beverage.

22. The method of claim 14, wherein the robotic arm is configured to perform one or more movements, and wherein the one or more movements comprise dance left, dance right, bow, and shake.

23. The method of claim 21, further comprising:

fetching a tip glass from the glasses resting tray upon placing each of the fetched one or more glasses on the used glasses tray, wherein the tip glass has a tip sticker on its surface; and moving the fetched tip glass to the one or more individuals to collect tips.

* * * * *